US011267350B2

(12) United States Patent
Bünker et al.

(10) Patent No.: US 11,267,350 B2
(45) Date of Patent: Mar. 8, 2022

(54) LINE SUPPLY ARRANGEMENT (71) Applicant: Stemmann-Technik GmbH, Schüttorf (DE)

(72) Inventors: Ludger Bünker, Emsbüren (DE); Simon Hendrik Evenblij, Nordhorn (DE)

(73) Assignee: Stemmann-Technik GmbH, Schüttorf (DE)

( * ) Notice: Subject to any disclaimer, the term of this patent is extended or adjusted under 35 U.S.C. 154(b) by 0 days.

(21) Appl. No.: 17/276,749

(22) PCT Filed: Sep. 9, 2019

(86) PCT No.: PCT/DE2019/100805
§ 371 (c)(1),
(2) Date: Mar. 16, 2021

(87) PCT Pub. No.: WO2020/057693
PCT Pub. Date: Mar. 26, 2020

(65) Prior Publication Data
US 2021/0354574 A1    Nov. 18, 2021

(30) Foreign Application Priority Data
Sep. 17, 2018  (DE) .................. 10 2018 122 663.2

(51) Int. Cl.
*B60L 53/35*    (2019.01)
*B60L 53/18*    (2019.01)
(Continued)

(52) U.S. Cl.
CPC ............. *B60L 53/18* (2019.02); *B60L 53/302* (2019.02); *B60M 1/12* (2013.01); *B60M 1/307* (2013.01); *B60L 53/35* (2019.02)

(58) Field of Classification Search
CPC ........ B60L 53/18; B60L 53/302; B60L 53/35; B60M 1/12; B60M 1/307
See application file for complete search history.

(56) References Cited

U.S. PATENT DOCUMENTS 1,467,253 A * 9/1923 Sharpsteen .......... H02G 11/003
                                                  191/12 R
9,365,116 B2 * 6/2016 Staley .................... B60L 15/20
(Continued)

FOREIGN PATENT DOCUMENTS

CN    104944213        9/2015
CN    107082030 A  *   8/2017
(Continued)

OTHER PUBLICATIONS

International Search Report issued by the European Patent Office in International Application PCT/DE2019/100805 dated Nov. 12, 2019.

*Primary Examiner* — Mark T Le
(74) *Attorney, Agent, or Firm* — Henry M. Feiereisen LLC (57) ABSTRACT

A line supply arrangement for electrically powered motor vehicles includes an electric line on a support arm above the motor vehicle. A trolley on the support arm positions the electric line such that a free end thereof hangs down from the trolley for connection to the motor vehicle and charging of an energy store. The trolley is movable relative to the support arm in horizontal direction or the support arm is movable and the trolley relative to the support arm in horizontal direction. Arranged on the trolley is a line reel to lower the free end of the electric line to the motor vehicle, and a hose reel is fixed on the support arm for supply and discharge of cooling liquid to and from the electric line. The trolley is movable relative to the hose reel. A heat exchanger is arranged distal to the trolley for cooling the cooling liquid.

9 Claims, 8 Drawing Sheets

(51) Int. Cl.
  *B60L 53/302*  (2019.01)
  *B60M 1/30*  (2006.01)
  *B60M 1/12*  (2006.01)

(56) References Cited

U.S. PATENT DOCUMENTS

| | | | |
|---|---|---|---|
| 2010/0277127 A1 | 11/2010 | Flack | |
| 2015/0060611 A1* | 3/2015 | Takahashi | B60L 53/14 |
| | | | 248/70 |
| 2017/0080812 A1* | 3/2017 | Lee | B60L 53/31 |
| 2018/0086216 A1* | 3/2018 | Rodriguez | B60L 53/16 |

FOREIGN PATENT DOCUMENTS

| | | | | |
|---|---|---|---|---|
| DE | 102011079870 | | 1/2013 | |
| DE | 102012220218 | | 5/2014 | |
| DE | 102014107153 | | 12/2014 | |
| DE | 202017100174 U1 * | | 4/2017 | B60L 53/18 |
| DE | 102016118193 A1 * | | 3/2018 | B60L 53/18 |
| DE | 102017100638 | | 4/2018 | |
| EP | 2 552 145 | | 1/2013 | |
| JP | 2012-090407 | | 11/2010 | |
| JP | 2011-160615 | | 8/2011 | |
| WO | WO-2013115375 A1 * | | 8/2013 | H02G 11/02 |

* cited by examiner

LINE SUPPLY ARRANGEMENT

CROSS-REFERENCES TO RELATED APPLICATIONS

This application is the U.S. National Stage of International Application No. PCT/DE2019/100805, filed Sep. 9, 2019, which designated the United States and has been published as International Publication No. WO 2020/057693 and which claims the priority of German Patent Application, Serial No. 10 2018 122 863.2, filed Sep. 17, 2018, pursuant to 35 U.S.C. 119(a)-(d).

BACKGROUND OF THE INVENTION

The invention relates to a line supply arrangement.

Electrically powered motor vehicles, in particular commercial vehicles and cars, must regularly drive to charging stations or be called back to a depot in order to be charged there. If it is possible, not only during downtimes at night, but, e.g., also during loading and unloading a truck, a moving line is connected to the motor vehicle in order to charge the batteries.

Loading and charging times of commercial vehicles are normally short in order to fully charge a battery. The more current is to be transferred in a short time, the greater the line cross-section at the charging station. The line being led from the charging station to the motor vehicle is flexible and is usually so heavy that it rests on the ground. This can lead to permanent damage to the line. The couplings are under severe stress. In addition, a conventional charging station may often not be set up near the vehicle, either because there is not enough space or because the charging station can be hit or knocked over by the commercial vehicle. The charging line would then have to be very long. The charging line is a tripping hazard for the user of the charging station.

It should also be taken into account that the large line cross-sections render handling of the lines very difficult. It is known to cool lines. Then, the cross-section of the metallic line can be reduced and thus the weight can also be decreased. However, the cooling renders the line slightly bulkier. It must also be taken into account that cooling itself adds weight.

Against this background, the invention is based on the object to provide a line supply system for electrically powered motor vehicles, which simplifies handling while at the same time enabling transfer of greater currents.

SUMMARY OF THE INVENTION

This object is attained with a line supply arrangement according to the features of patent claim 1.

The subclaims set forth advantageous refinements of the invention.

The line supply arrangement according to the invention for electrically powered motor vehicles includes an electric line for charging an energy store of the motor vehicle. The energy store is also referred to hereinafter as accumulator or ACCU for short. The electric line is connected to an energy source via which the current to be transported is provided. Provision is made in the invention for arranging the electric line on a support arm. The support arm includes a trolley for positioning the line that is to be led to the motor vehicle. The support arm can be displaced in horizontal direction and/or the trolley can be displaced in relation to the support arm in horizontal direction. This makes it possible to bring the line into a preferred connection position to the motor vehicle to be charged.

The trolley is located at a height above the motor vehicle to be charged. The function of the trolley is to release a free end of the line, which free end hangs down from the trolley on the support arm. This line is connected to the motor vehicle from above for charging. The clear height below the trolley permits free passage of cars and trucks and is governed by the national regulations for dimensions of motor vehicles. The clear height is at least 4 m, preferably at least 4.5 m.

The main advantage of the invention is that the electric line is supported and led from above without contact with the ground. The line can be brought into the correct position horizontally along and across the vehicle. There is no need to place it across the motor vehicle or to guide it around the motor vehicle, but can be connected to the charging connection approaching vertically from above, when the trolley is appropriately positioned. For this purpose, the free end of the line has a plug or a coupling. Orientation of plug and coupling may deviate from the vertical. The electric line is flexible.

The line is also liquid-cooled. Liquid cooling enables the use of smaller cross-sections. As a result, the line becomes lighter and more flexible. Although liquid cooling slightly increases complexity for such a line supply arrangement, handling of the line becomes, however, as a result easier because the line is lighter and therefore also more flexible.

When the line cross-section is not reduced, it is possible to transmit 30-50% more current with the same line cross-section. According to the invention, it is provided that the line cross-section is preferably not reduced in order to be able to transmit greater currents. It may even be increased. The invention enables charging of accumulators in a shorter time, without complicating handling of the electric line as a consequence of the greater cross-sections. In this way, it is possible to supply a truck with a large amount of electrical energy in a very short time, for example during loading and unloading, without the risk of the electric line being run over or encountering damage to the charging station itself, for example due to maneuvering errors. After charging, the free end of the electric line can be decoupled and elevated again and stored in a line storage on the trolley or on the support arm.

The invention also takes into account the possibility that the line can freely hang down up to a certain length from the support arm or from the trolley in order for the operator to be able to easily reach it. However, this has the disadvantage that there is a risk of colliding with the line during maneuvering. Preferably, therefore, the free end of the line is retracted after charging at least so far in a direction of the trolley that a vehicle can maneuver freely underneath the line.

The power supply arrangement includes at least one hose reel for supplying and discharging a cooling liquid to and from the electric line. The hose reel is arranged in particular in the vicinity of a pivot axis of the support arm. The hose reel has the function of providing the electric line with the required cooling liquid, irrespective of the position on the support arm from which the electric line is lowered. Power can also be supplied via a conductor rail when using a hose reel. Preferably, electrical energy is also transmitted via the hose reel at the same time, so that the hose reel is also a line or cable reel at the same time. In this case, the hose reel has a slip ring transmitter for transfer of electrical energy.

The support arm is swingable in particular about a vertical pivot axis. The support arm acts like the boom of a tower crane. The vertical pivot axis is located in or on a tower or a support column, to which the support arm is mounted. The support arm can protrude transversely from the support column on one side. It is also possible to arrange a counterweight on the side opposite the pivot axis. The support arm can in particular be configured in lattice configuration. Guying means above the support arm prevents sagging and enables a light construction which at the same time can be subjected to great stress with wide extension. Such a line supply arrangement can be arranged in the outer region. The support arm has a length which is preferably greater than the typical vehicle width of approximately 2.5 m. It has a length of 4-8 m, for example, so that there is sufficient maneuverability in relation to the central support column.

The support arm itself is situated at a distance from the ground or the roadway. The support arm can also be fastened to a support structure which does not support the support arm from below, but holds it from above, for example on a ceiling structure e.g. In a warehouse or a vehicle hall.

An alternative embodiment includes a frame structure on which the support arm can be displaced linearly. A linear shift of the support arm and a simultaneous displacement of the trolley along the support arm also enable an individual positioning of the electric line. The linearly displaceable support arm can be supported at both its ends. The invention includes line supply arrangements which operate on the principle of a column-mounted slewing crane or a gantry crane. The support arm can be guided along crane runways or rails in the area of the walls or in the area of support pillars of a hall. The support arm can be fastened to such support pillars which serve as a support column.

According to an advantageous refinement of the invention, the displacement of the support arm and/or the trolley is respectively implemented by a motor drive. For example, an operating unit can be arranged on a support column for enabling a movement of the support arm and the trolley into the correct position. Also lowering of the electric line from the trolley downwards can be implemented via an electric drive. All drives can be remote controlled. Provision can be made for a wireless remote control.

It is also possible to have a rope hang down from the trolley which rope cannot be damaged when a vehicle drives against this rope and also does not cause any damage to the vehicle. This rope can be used to manually move the trolley into the correct position. By pulling harder on the rope, the electric line can also be pulled down and connected. In an advantageous embodiment of the invention, a line reel for the line is arranged on the trolley. Lowering and lifting the free end of the line can be realized by a drive. The line reel involves, for example, a motor-driven line reel. In order to facilitate lifting of the relatively heavy line, also a spring-driven line reel or a counterweight reel can be involved. The combination with a weight compensation or with a spring balancer or a so-called balancer is also possible for easily moving the heavy electric line with only little effort into the connection position or the starting position. A cable trolley system or a conductor rail can run along the support arm for current transfer. The trolley is electrically connected via the conductor rail in order to connect the line that begins at the trolley with current from an electrical energy source.

In a system with a cable trolley system, cables and/or hoses are routed in bends. Cables and hoses are hung in a clear manner on the support arm so that they are not obstacles in the traffic path of the motor vehicle. It is important that the support arm is mounted sufficiently high enough so that the individual loops in a cable trolley or cable drag system are located at all times at a height that does not allow a collision with the motor vehicle.

Cooling of the cooling fluid is realized in a heat exchanger. This heat exchanger can be arranged distal from the trolley, for example stationary on the support column. For the cooling fluid to be able to circulate, the hose reel winds one hose as lead and one as return.

It is also possible to arrange the heat exchanger directly on the trolley. When, for example, a conductor rail transfers the necessary current to the trolley, further cooling is required only in the area of the electric line on the trolley. The cooling fluid circulates in the jacket of the electric line and is cooled directly at the heat exchanger of the trolley.

Under certain circumstances, for example for acoustic reasons, it may be useful to arrange the heat exchanger in the vicinity of the support column. The heat exchanger can also be arranged at a distance from the support column and at a distance from the support arm. For example, in the presence of several support arms or line supply arrangements, it is possible to provide a common central heat exchanger.

The invention has the essential advantage that the heavy electric line does not become an obstacle when not in use. Damage to the line is therefore much less likely. There are no obstacles, such as e.g. ground-based charging stations, in the maneuvering zone of the motor vehicles. As a result of cooled lines, significantly more current can be transferred in a shorter time. The downtimes of the motor vehicles due to charging are reduced and the degree of utilization of the motor vehicles is improved.

BRIEF DESCRIPTION OF THE DRAWING

The invention will be explained hereinafter with reference to the exemplary embodiments shown schematically in the figures. It is shown in.

DETAILED DESCRIPTION OF PREFERRED EMBODIMENTS

The line supply arrangement 1 according to FIGS. 1 to 4 is used to provide electrical energy to an electrically operated motor vehicle, not shown in detail, for charging its energy store. The electric motor vehicle is in particular a car or a truck, in particular a commercial vehicle. The motor vehicle involved here is a motor-driven vehicle that is not bound to rails, i.e. a motor vehicle, a motorcycle or a tractor.

Figure 1:
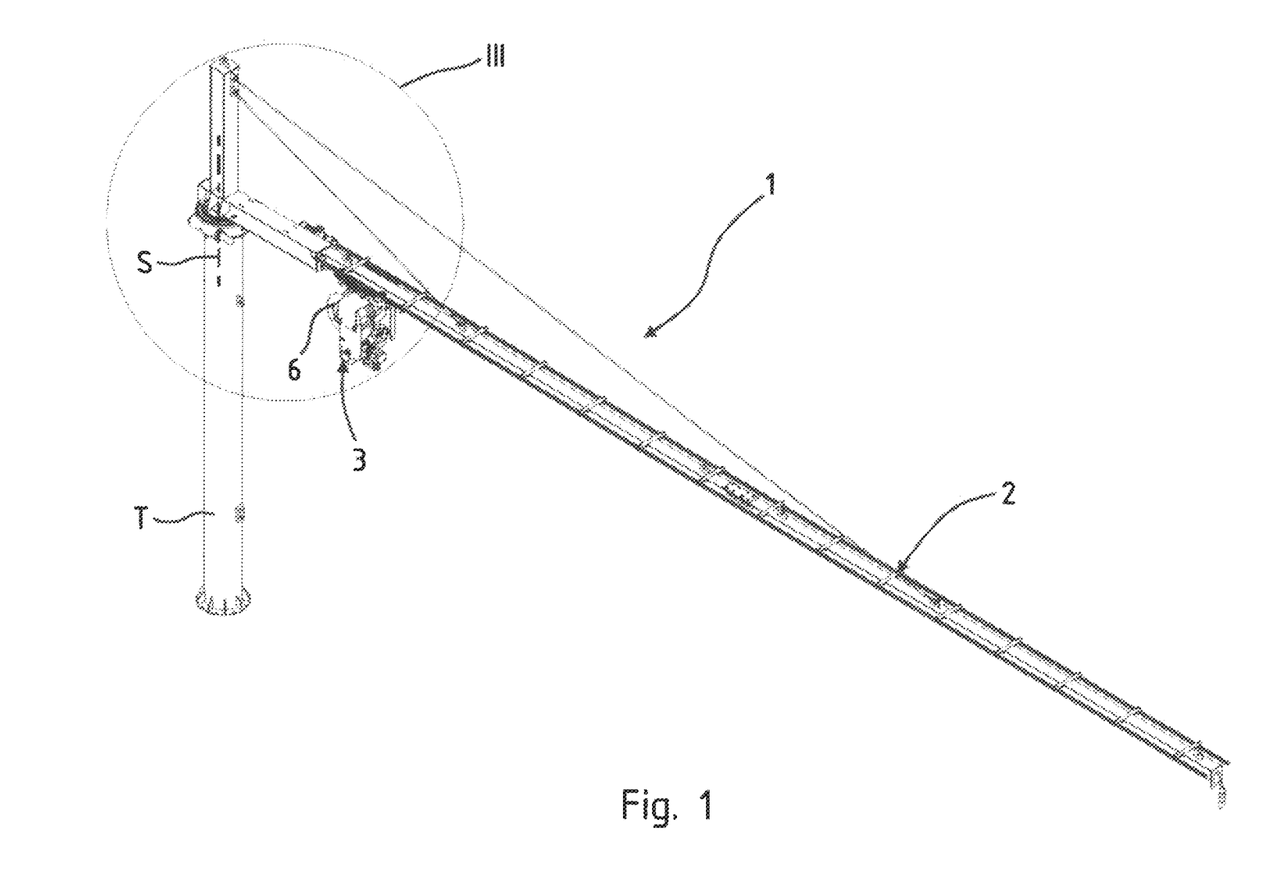
FIG. 1 a perspective view of a first embodiment of a line supply arrangement.
Figure 2:
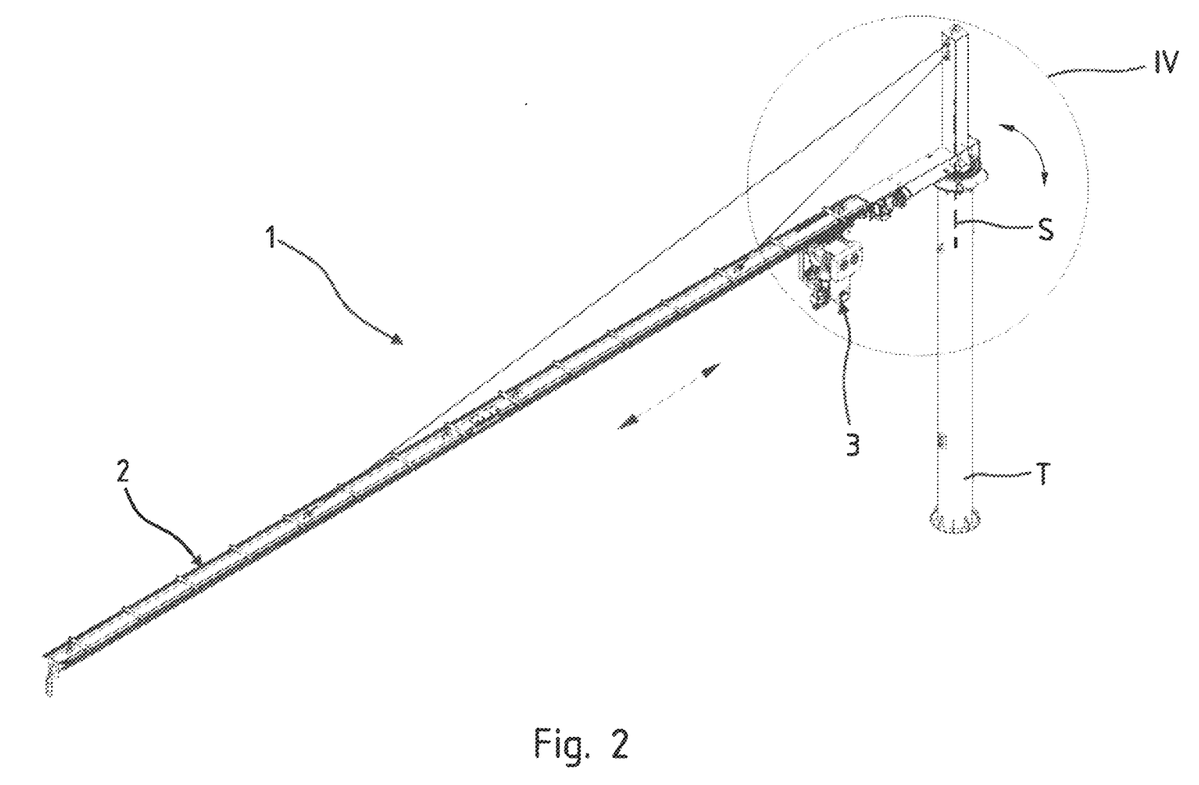
FIG. 2 the embodiment of the line supply arrangement from another perspective.

The line supply arrangement 1 includes a support arm 2 which is secured to a support column T. The support arm 2 is secured to the upper end of the support column T so as to be arranged at a distance from the base of the support column T to permit the motor vehicle to be charged to travel under the support arm 2.

The support arm 2 is longer than the support column T is high. It has a length of at least 4 m, preferably even at least 8 m.

Located on the support arm 2 is a trolley 3 which is movable in longitudinal direction of the support arm 2. The trolley 3 is located in any position on the support arm 2 above the motor vehicle to be charged. The trolley 3 is used to bring an electric line 4 for charging an energy store of the motor vehicle into the correct position in relation to the motor vehicle. For this purpose, the support arm 2 can be pivoted about a pivot axis S in the center of the support column T. As a result, the support arm is displaceable in a floating manner in the horizontal direction. At the same time, the trolley 3 is displaceable in longitudinal direction of the support arm 2, so that various positions can be approached within the range of the support arm 2 for allowing an end 5 (FIG. 3) of the line 4 can be lowered to charge the vehicle. A plug or a coupling can be arranged at the free end 5 of the line 4 in order to connect the line 4 to the motor vehicle.

Figure 3:
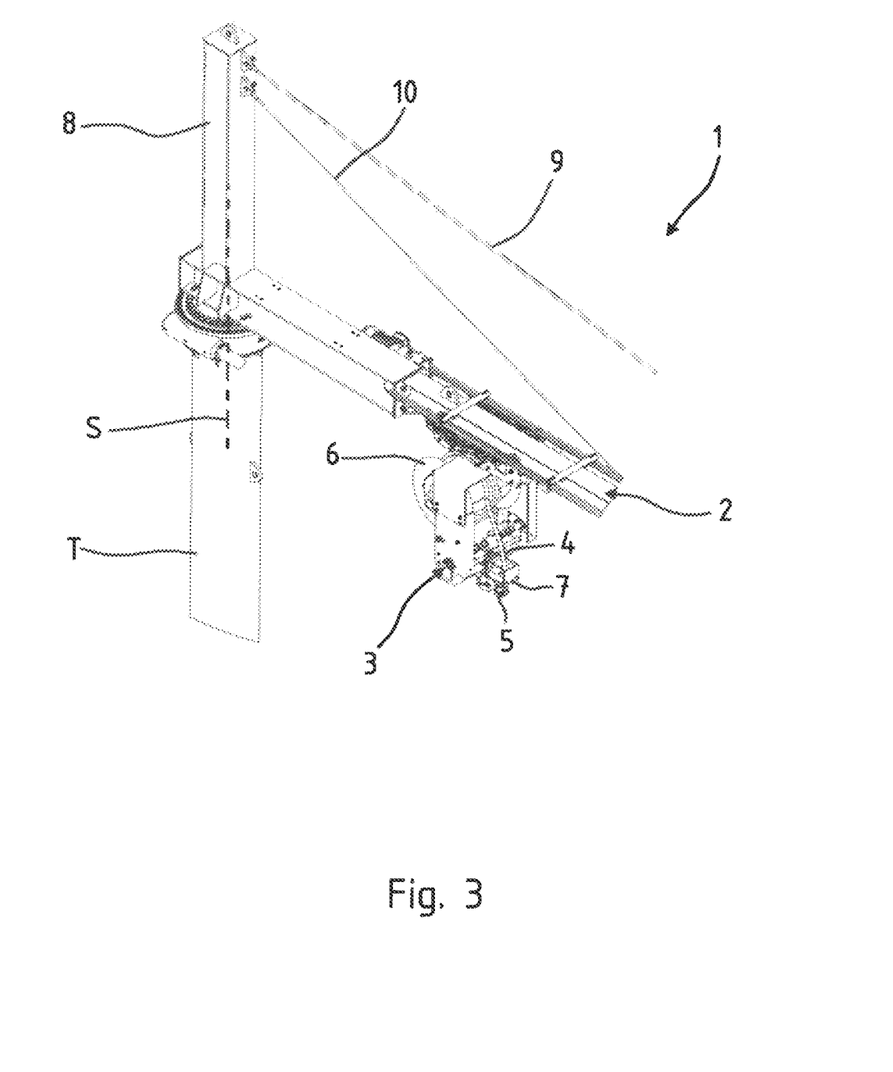
FIG. 3 the detail III of FIG. 1.

After charging, the line 4 can be reeled in and pulled upwards. For this purpose, a line reel 6 is located on the trolley 3. The line reel 6 may involve, for example, a motor cable reel. The line reel 6 can also be spring-loaded or equipped with a balancer, so that the electric line 4 can easily be pulled upwards and can never unwind spontaneously from the line reel 6. It is also conceivable that a movement of the line reel 6 is released when a higher-level control unit gives the signal for release, for example when the vehicle operator has received authorization to draw current via the line supply arrangement.

The line supply arrangement 1 can have a very long support arm. Provision is therefore made for arrangement of a bracing arm 8 above the support arm T in prolongation of the pivot axis S. Secured to the bracing arm 8, are two guying means 9, 10, e.g. In the form of wire ropes, which are connected to the top of the support arm 2 at different distances from the pivot axis S. As a result, the support arm 2 can be configured slender, while at the same time can bear high loads without sagging. In this case, the bracing arm 8 is firmly connected to the support arm 2 and can be pivoted about the pivot axis S together with the support arm 2.

The energy supply to the trolley 3 is realized via at least one conductor rail. The conductor rail is in electrical contact with the trolley 3 and the electric line 4 via a slip ring transmitter. The electric line 4 for transferring the current is therefore located exclusively on the line reel 6 on the trolley 3.

Figure 4:
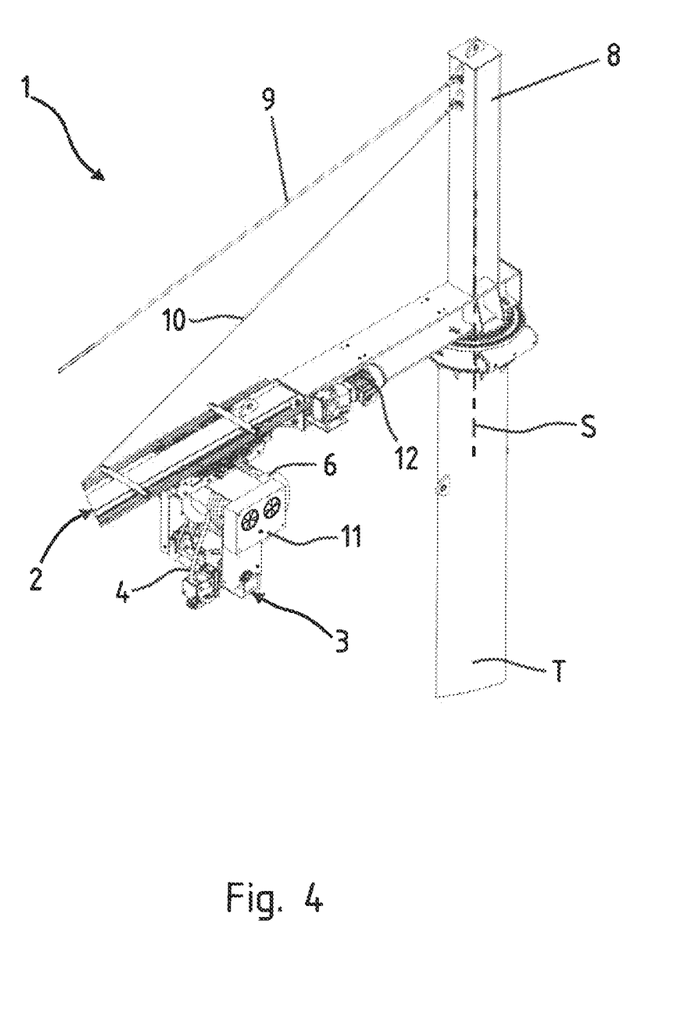
FIG. 4 the detail IV from FIG. 2.

As can be seen from the illustration in FIG. 4, a heat exchanger 11 is fastened to the trolley 3. The line 4 is liquid-cooled. The resultant heat is dissipated to the ambient air via the heat exchanger 11. The heat exchanger 11 is arranged in the vicinity of the line 4 so that heat can be dissipated directly on site. The line 4 can therefore be configured relatively short. It only has to bridge the distance from the trolley 3 to the ground or to the connection point of the vehicle in vertical direction. As a result, the entire trolley 3 can be designed to be comparatively light. FIG. 4 further shows a drive 12 comprising a motor and a transmission, via which the trolley 3 is driven and able to travel along the support arm 2.

FIGS. 5 to 8 show a second exemplary embodiment, in which the previously introduced reference symbols are retained for components that are essentially structurally identical. Furthermore, reference can be made to the description above.

Figure 5:
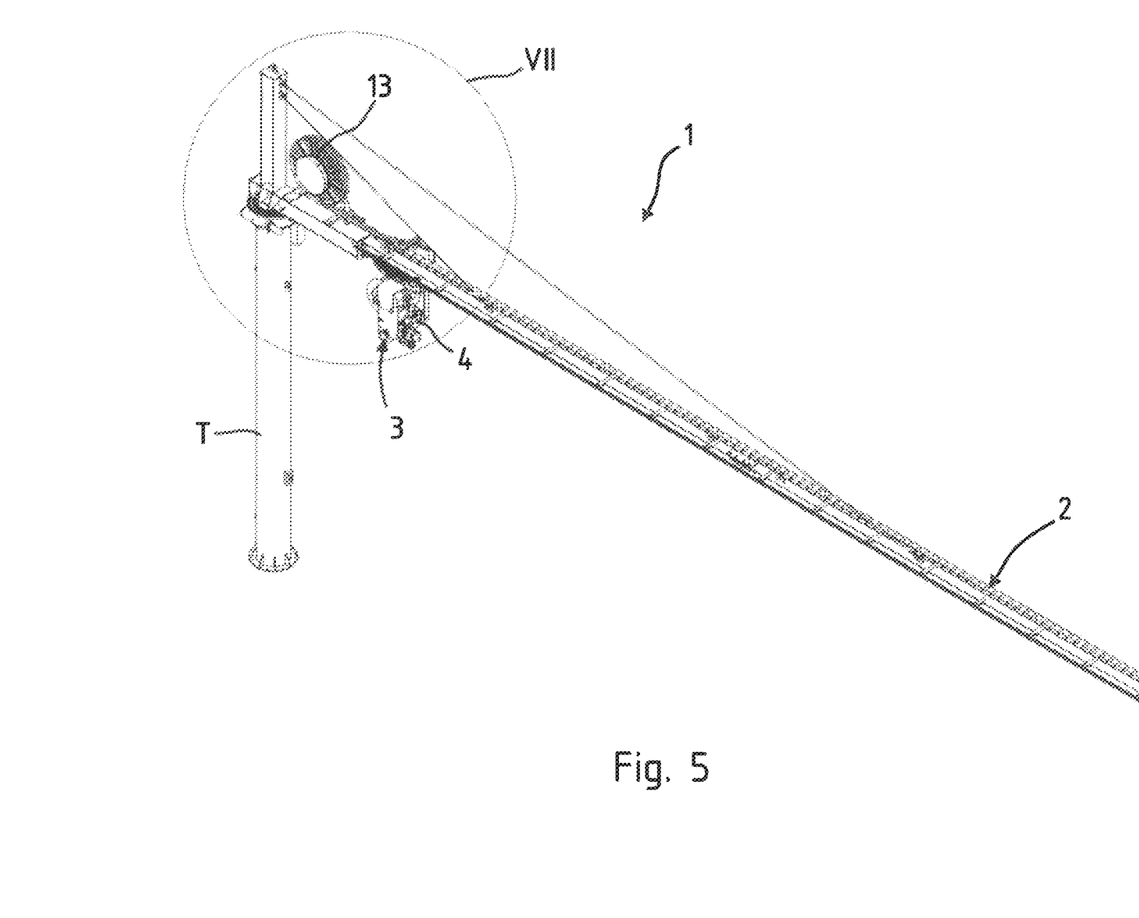
FIG. 5 a perspective illustration of a further embodiment of a line supply arrangement.
Figure 6:
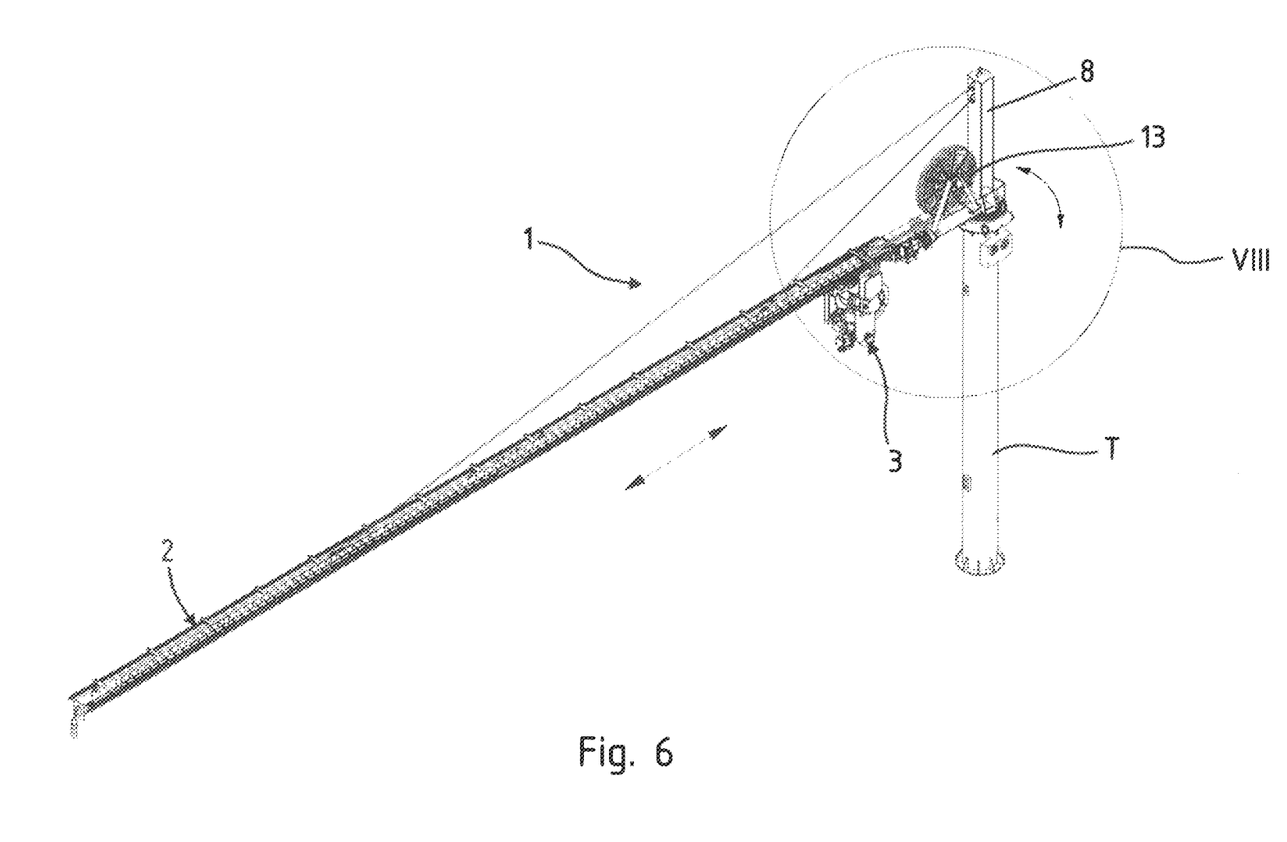
FIG. 6 a further perspective of line supply arrangement of FIG. 5.

A difference compared to the first embodiment is that the energy supply to the trolley 3 is not implemented via a conductor rail, but via a hose reel 13, This hose reel is located on the support arm 2, but stationary in the vicinity of the support column T.

Figure 7:
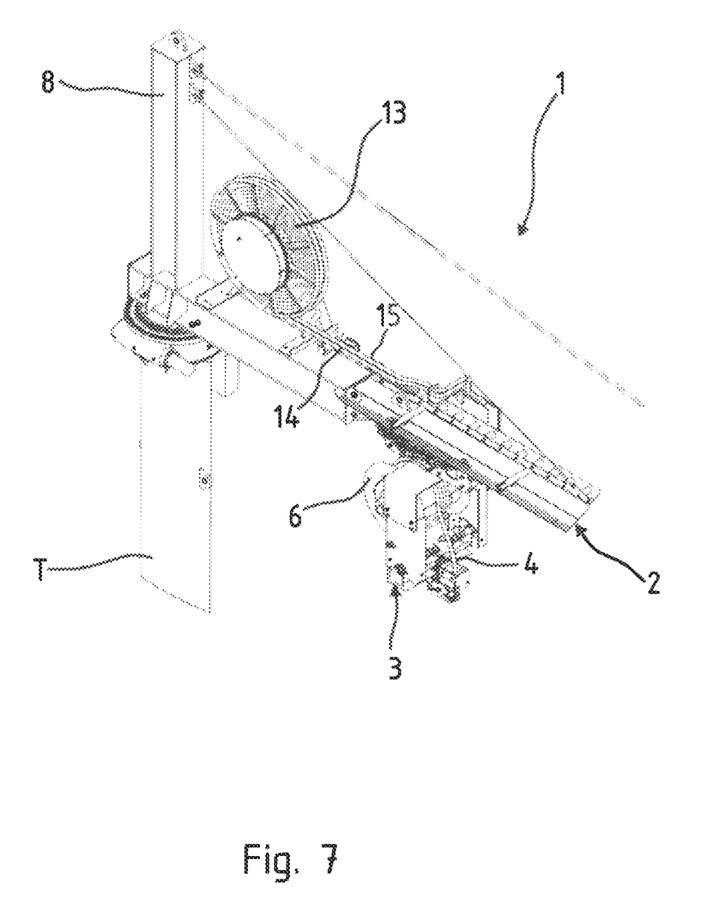
FIG. 7 the detail VII of FIG. 5.
Figure 8:
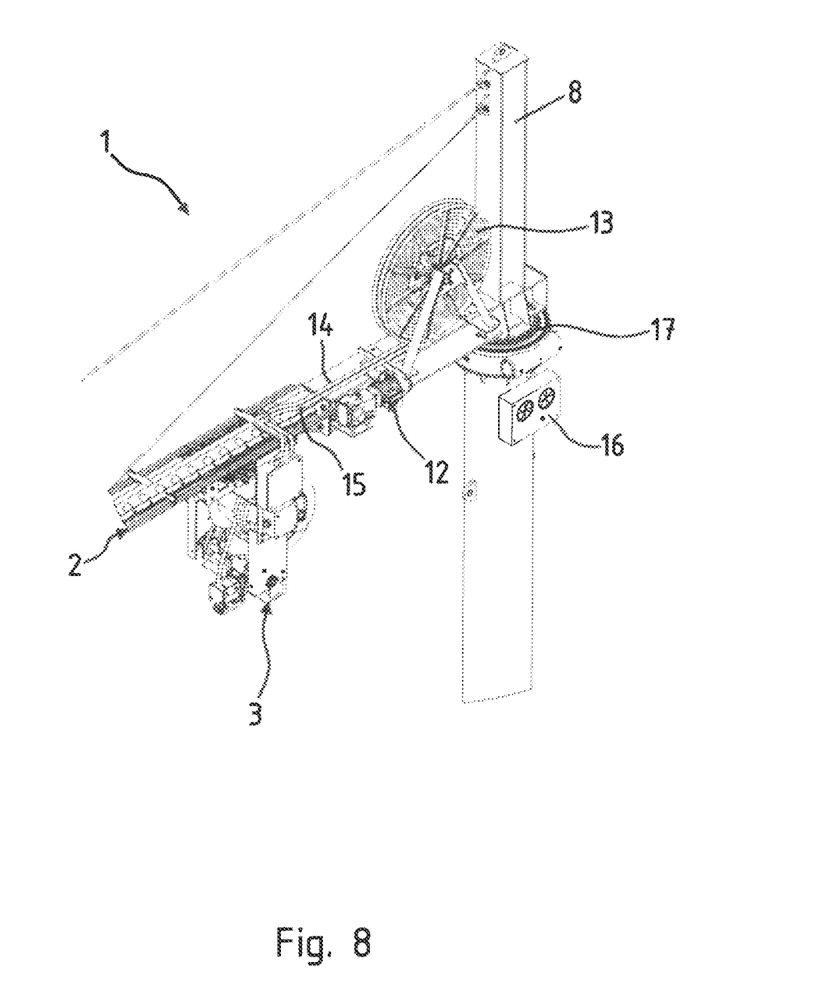
FIG. 8 the detail VIII of FIG. 6.

The hose reel 13 is provided to supply and discharge a cooling liquid to and from the electric line 4 on the trolley 3. FIGS. 7 and 8 show that two hoses are wound and unwound at the same time. These two hoses 14, 15 lead to the trolley 3 and to the electric line 4 arranged there for charging the motor vehicle. Depending on the position of the trolley 3, the hoses 14, 15 are reeled in or unwound. It is possible within the scope of the invention that the electrical energy is also transferred via one of the hoses 14, 15. However, it is also conceivable that the hoses 14, 15 only carry a cooling liquid, in particular cooling water, which is cooled in a heat exchanger 16 on the support column T. The heat exchanger 16 is connected to the hoses 14, 15 in a manner not shown in greater detail. For this purpose, the hose reel 13 has double rotary feedthroughs.

The heat exchanger 16 can also be arranged at a distance from the support column T. The heat exchanger 16 is preferably located in an area so as to be swingable together with the support arm 2.

A cable feedthrough for the electrical energy supply but also for coolant-carrying lines can be arranged in the area of a pivot bearing 17 on the upper side of the support column T. The pivoting movement of the support arm 2 can be restricted so that the lines are not damaged when pivoting. However, it is also conceivable to provide a slip ring transmitter in the area of the pivot bearing at least for the electrical supply line. Control signals may also be transmitted to the trolley 3 or to the drive 12 of the trolley 3 via further sliding contacts.

REFERENCE SIGNS

1—line supply arrangement
2—support arm
3—trolley
4—electric line
5—connector
6—line reel
7—cable guide
8—bracing arm
9—guying means
10—guying means
11—heat exchanger
12—drive for
13—hose reel
14—hose
15—hose
16—heat exchanger
17—pivot bearing
S—pivot axis
T—support column

The invention claimed is:

1. A line supply arrangement for an electrically powered motor vehicle, said line supply arrangement comprising:
   a support arm;
   an electric line arranged on the support arm at a height above the motor vehicle to be charged, said electric line having a free end;
   a trolley arranged on the support arm for positioning the electric line such that the free end of the electric line hangs down from the trolley from above for connection to the motor vehicle and charging an energy store of the motor vehicle, wherein the trolley is movable relative to the support arm in a horizontal direction or wherein the support arm is movable in a horizontal direction and the trolley is movable relative to the support arm in the horizontal direction;
- a line reel arranged on the trolley in order to lower the free end of the electric line to the motor vehicle;
- a hose reel stationarily arranged on the support arm for supply and discharge of a cooling liquid to and from the electric line, said trolley being movable relative to the hose reel; and
- a heat exchanger arranged distal to the trolley for cooling a cooling liquid.

2. The line supply arrangement of claim 1, wherein the support arm is swingable about a vertical pivot axis.

3. The line supply arrangement of claim 1, further comprising a support column, said support arm being arranged on the support column and swingable relative to the support column.

4. The line supply arrangement of claim 1, wherein the support arm is displaceable linearly in the horizontal direction with respect to a support structure.

5. The line supply arrangement of claim 1, further comprising a motorized drive for moving the support arm and/or for moving the trolley.

6. The line supply arrangement of claim 1, further comprising a conductor rail arranged on the support arm, said electric line being electrically connected to the conductor rail via the trolley.

7. The line supply arrangement of claim 1, wherein the line reel is a spring-driven line reel, a motor-driven line reel or a counterweight reel, or wherein the electric line is connected to a weight equalizer.

8. The line supply arrangement of claim 1, wherein the hose reel includes a double rotary feedthrough for the supply and discharge of cooling liquid.

9. The line supply arrangement of claim 1, wherein the hose reel includes a slip ring transmitter, said electric line being routed via the hose reel.

* * * * *

UNITED STATES PATENT AND TRADEMARK OFFICE
CERTIFICATE OF CORRECTION

PATENT NO. : 11,267,350 B2
APPLICATION NO. : 17/276749
DATED : March 8, 2022
INVENTOR(S) : Ludger Bünker et al.

It is certified that error appears in the above-identified patent and that said Letters Patent is hereby corrected as shown below:

In the Specification

Under CROSS-REFERENCES TO RELATED APPLICATIONS

In Column 1, Line 11, Replace "Serial No. 10 2018 122 863.2" with --Serial No. 10 2018 122 663.2--.

Under REFERENCE SIGNS

In Column 6, Line 47, Replace "drive for" with --drive for 3--.

Signed and Sealed this
Thirty-first Day of May, 2022

Katherine Kelly Vidal
*Director of the United States Patent and Trademark Office*